Mar. 3, 1925.

1,528,104

A. F. EWART ET AL

ENTRAINMENT TRAP

Filed Aug. 19, 1924

Inventors
A. F. Ewart
Seymour Terry
By O'Neill & Bunn
Attorneys

Patented Mar. 3, 1925.

1,528,104

UNITED STATES PATENT OFFICE.

ARTHUR F. EWART AND SEYMOUR TERRY, OF HONOLULU, TERRITORY OF HAWAII.

ENTRAINMENT TRAP.

Application filed August 19, 1924. Serial No. 732,944.

*To all whom it may concern:*

Be it known that we, ARTHUR F. EWART and SEYMOUR TERRY, citizens of the United States, residing at Honolulu, Territory of Hawaii, have invented certain new and useful Improvements in Entrainment Traps; and we do hereby declare the following to be a full, clear, and exact description of the invention, such as will enable others skilled in the art to which it appertains to make and use the same.

The invention relates to a novel form of entrainment trap or save-all adapted to be applied to the interior of an evaporator, vacuum pan, or similar apparatus, for the purpose of separating the liquid entrained in the vapors, and returning the separated liquid to the lower part of the evaporator, thereby preventing the loss of the entrained liquid. The new form of trap is especially designed to be applied as an ancillary element of or attachment for evaporators already in use, as well as to be built into new evaporators, and to this end comprises an annular bottom plate, preferably of dish-shape, sloping toward the central opening, which bottom plate is of less diameter than the evaporator chamber, and is adapted to be secured with its peripheral edge in spaced relation from the wall of the evaporator chamber by suitable brackets, an upper annular plate, spaced vertically from the lower plate, said plate being of a diameter such that its peripheral edge engages the walls of the evaporator chamber, a series of vertical baffle plates disposed between the top and bottom plates, the baffles being of zig-zag form, to provide a multiplicity of tortuous passageways through the trap from the periphery toward the center, the zigzag shape of the baffles also providing a very large number of vertical walls against which the vapors and entrained liquid impinge in passing through the trap, so that the liquids will be arrested and will run down the walls and along the upper surface of the bottom plate until they are discharged through a suitable conduit connected with the central opening of the bottom plate, said conduit ultimately delivering the liquid to the lower part of the evaporator chamber. In order to increase the retarding effect of the zigzag baffle plates, the latter are provided at their elbows or exterior angular edges, with curved extensions which, in effect, constitute pockets which tend to set up a whirling motion in the vapors, which will further assist in separating the liquid from the vapors, the lower edges of the curved extensions terminating short of the bottom plate to provide escape openings for the separated liquid and permit the latter to run freely over the bottom plate to the central discharge therein.

The invention is illustrated in the accompanying drawings in which:—

Figure 1:
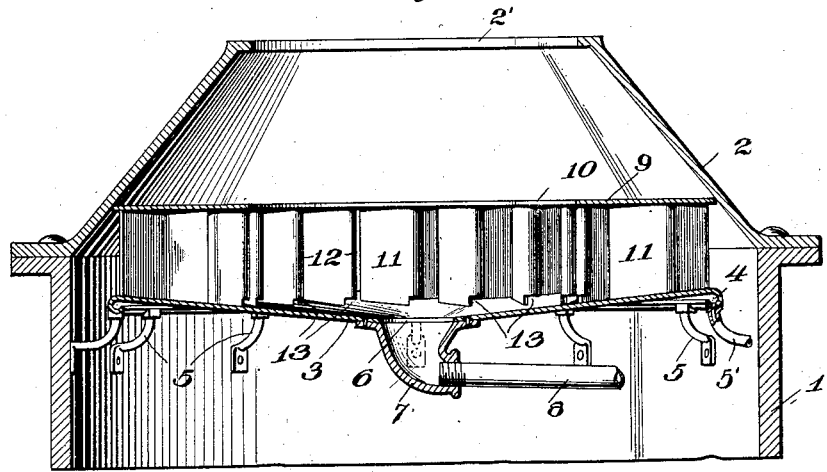
Fig. 1 is a vertical section through the upper part of a typical evaporator, having the entrainment trap applied thereto.
Figure 2:
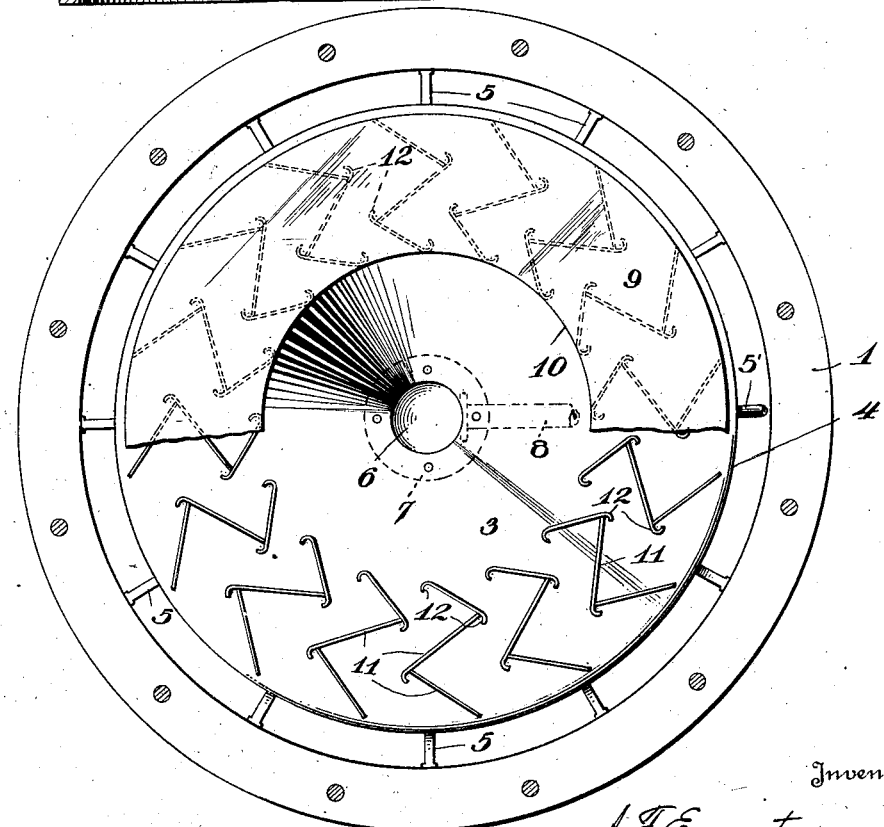
Fig. 2 is a plan view with the top of the evaporator chamber removed and the upper plate of the trap broken away, in part.

Referring to the drawings, 1 indicates the body or shell of a standard evaporator or vacuum pan, which is generally cylindrical in shape, and is provided with a generally frusto-conical top section 2 having the usual discharge opening 2' at the top. In the operation of an apparatus of this general type, commonly used in sugar boiling and similar operations, a relatively large amount of the liquid is entrained by and carried off in the vapors, unless specific means are provided for separating the entrained liquid from the vapors. Various forms of save-alls and entrainment traps have been devised heretofore for this purpose, but in most cases the save-alls have involved expensive and more or less complicated constructions formed as component parts of the evaporator, and thereby making it difficult to clean or repair the same. The instant invention provides an entrainment trap which may be readily applied to any of the standard types of evaporators at a minimum cost of labor and materials, but which will nevertheless produce quite as effective results as the more expensive and older types of save-alls.

As shown in the drawings, the entrainment trap is adapted to be installed within the upper part of the evaporator chamber, in such manner that the rising vapors carrying the entrained liquid will be caused to pass laterally over the bottom of the trap, thence inwardly through the trap by way of a series of tortuous passages which produce rapid changes in direction of flow of the vapors, and present a large number of vertical walls against which the vapors impinge, the change of direction and impact of the vapors being effective in arresting and throwing out the entrained liquid. The trap proper comprises a bottom plate 3, preferably being slightly dished or concaved toward the center and terminating in a downwardly turned peripheral edge portion 4 which materially reinforces the bottom plate and acts as a collecting chamber for entrained liquor, and also serves as a ready means for attachment of the brackets 5, by means of which the trap is supported within the evaporator chamber. A pipe 5' connected to the chamber formed by the peripheral edge portion 4 serves to drain the liquid collected in said chamber back into the evaporator chamber. The diameter of the bottom plate 3 is less than the interior diameter of the evaporator chamber, thereby leaving an annular space for the passage of the vapors rising in the chamber. The center of the bottom plate 3 is provided with an opening 6 below which is secured a union 7, from which leads drain pipe 8, which may terminate at any desired point in the lower part of the evaporator chamber. An upper annular plate 9, having an enlarged central opening 10, is spaced vertically from the bottom plate 3 by a series of vertical zigzag baffle plates 11, connected to the respective plates in any suitable manner, and forming a series of tortuous passages extending in a general radial direction from the periphery of the trap toward the center thereof. The peripheral edge of the top plate 9 engages the walls of the evaporator chamber, so as to prevent the escape of vapor between said peripheral edge and the wall of the chamber.

Preferably the baffle plates 11 are provided at their vertical angles, or meeting edges, with curved extensions 12 which constitute additional obstructions to the flow of the vapors through the trap and are effective in setting up vertical whirls of the vapors as the latter pass through the tortuous channels or passages between the baffles. The lower ends of the curved extensions 12 terminate short of the bottom plate 3 to permit the liquid separated from the vapors to escape from the pocket-like elements formed by the said extensions 12.

From the foregoing description, it will be apparent that the vapors generated in the evaporator, and carrying the entrained liquid, upon reaching the entrainment trap, will be deflected by the lower face of the bottom of the trap outwardly towards the walls of the chamber 1, thence inwardly through the trap, where said vapors follow the zigzag passages formed between the baffle plates, whereby the vapors are caused to change their direction of flow and are also caused to impinge with more or less violence against the vertical walls of the baffle plates, which will have the effect of arresting the entrained liquids which flow down the vertical walls and onto the bottom plate, whence they are discharged through the central opening 6 therein, and will be carried off by the drain pipe 8 to the lower portion of the evaporator chamber. As hereinbefore indicated, the curved extensions 12, located on the elbows or angular joints of the baffle plates, will be further effective in separating the entrained liquid by setting up whirling movements in the currents of vapor passing through the tortuous passages, the liquid which is arrested within the curved extensions escaping through the opening 13 between the bottom edges of said extensions and the top surface of the bottom plate 3.

What we claim is:

1. An entrainment trap for evaporators comprising an annular bottom plate of less diameter than the evaporator chamber, a vertically spaced annular top plate the peripheral edge of which is adapted to engage the wall of the evaporator chamber, zig-zag vertical baffle plates disposed between and engaging the top and bottom plates forming a series of tortuous passages from the periphery towards the center of the trap, and a conduit connected to a central opening in the bottom plate to return the separated liquid to the lower part of the evaporator chamber.

2. An entrainment trap for evaporators comprising an annular dish-shaped bottom plate of less diameter than the evaporator chamber, a vertically spaced annular top plate the peripheral edge of which is adapted to engage the wall of the evaporator chamber, zig-zag vertical baffle plates disposed between and engaging the top and bottom plates forming a series of tortuous passages from the periphery towards the center of the trap, and a conduit connected to a central opening in the bottom plate to return the separated liquid to the lower part of the evaporator chamber.

3. An entrainment trap for evaporators comprising an annular bottom plate of less diameter than the evaporator chamber, a vertically spaced annular top plate the peripheral edge of which is adapted to engage the wall of the evaporator chamber, zig-zag vertical baffle plates disposed between and engaging the top and bottom plates forming a series of tortuous passages from the periphery towards the center of the trap, said baffle plates having curved extensions at their exterior angular edges, and a conduit connected to a central opening in the bottom plate to return the separated liquid to the lower part of the evaporator chamber.

4. An entrainment trap for evaporators comprising an annular bottom plate of less diameter than the evaporator chamber, a vertically spaced annular top plate the peripheral edge of which is adapted to engage the wall of the evaporator chamber, zig-zag vertical baffle plates disposed between and engaging the top and bottom plates forming a series of tortuous passages from the periphery towards the center of the trap, said baffle plates having curved extensions at their exterior angular edges terminating short of the bottom plate, said baffle plates having curved extensions at their exterior angular edges, and a conduit connected to a central opening in the bottom plate to return the separated liquid to the lower part of the evaporator chamber.

5. An entrainment trap for evaporators comprising an annular bottom plate of less diameter than the evaporator chamber, brackets for supporting said plate in spaced relation within said chamber, a vertically spaced annular top plate the peripheral edge of which is adapted to engage the wall of the evaporator chamber, zig-zag vertical baffle plates disposed between and engaging the top and bottom plates forming a series of tortuous passages from the periphery towards the center of the trap, and a conduit connected to a central opening in the bottom plate to return the separated liquid to the lower part of the evaporator chamber.

In testimony whereof we affix our signatures.

ARTHUR F. EWART.
SEYMOUR TERRY.

Witness:
J. J. MACGARVEY.